(12) United States Patent
Sylvain

(10) Patent No.: US 8,199,743 B1
(45) Date of Patent: Jun. 12, 2012

(54) ENHANCED SERVICES FOR A POTS LINE

(75) Inventor: Dany Sylvain, Gatineau (CA)

(73) Assignee: Rockstar Bidco, LP, New York, NY (US)

( * ) Notice: Subject to any disclaimer, the term of this patent is extended or adjusted under 35 U.S.C. 154(b) by 1446 days.

(21) Appl. No.: 11/289,182

(22) Filed: Nov. 29, 2005

(51) Int. Cl.
  *H04L 12/66* (2006.01)
  *H04L 12/56* (2006.01)
(52) U.S. Cl. .................................. 370/352; 370/401
(58) Field of Classification Search .................. None
  See application file for complete search history.

(56) References Cited

U.S. PATENT DOCUMENTS

| | | | |
|---|---|---|---|
| 6,633,633 B1* | 10/2003 | Bedingfield | 379/201.11 |
| 2003/0002637 A1* | 1/2003 | Miyauchi et al. | 379/93.01 |
| 2003/0086559 A1* | 5/2003 | Chen et al. | 379/399.01 |
| 2003/0152066 A1* | 8/2003 | Luciano, III | 370/352 |
| 2004/0105530 A1* | 6/2004 | Schwab et al. | 379/88.19 |
| 2004/0192292 A1* | 9/2004 | Chang et al. | 455/426.1 |
| 2004/0218583 A1* | 11/2004 | Adan et al. | 370/352 |
| 2005/0005190 A1* | 1/2005 | Ofir et al. | 714/4 |
| 2005/0041792 A1* | 2/2005 | Bedingfield, Sr. | 379/211.01 |
| 2005/0232243 A1* | 10/2005 | Adamczyk et al. | 370/352 |
| 2005/0260975 A1* | 11/2005 | Chen et al. | 455/415 |
| 2006/0007915 A1* | 1/2006 | Frame | 370/352 |
| 2006/0056393 A1* | 3/2006 | Sarmiento | 370/352 |
| 2006/0133345 A1* | 6/2006 | Benco et al. | 370/352 |
| 2007/0032225 A1* | 2/2007 | Konicek et al. | 455/417 |
| 2007/0047559 A1* | 3/2007 | Son | 370/401 |
| 2007/0058613 A1* | 3/2007 | Beckemeyer | 370/352 |
| 2007/0127707 A1* | 6/2007 | Koser et al. | 379/373.03 |
| 2007/0239429 A1* | 10/2007 | Johnson et al. | 704/8 |
| 2008/0037741 A1* | 2/2008 | Bear et al. | 379/142.01 |

* cited by examiner

*Primary Examiner* — Clemence Han
(74) *Attorney, Agent, or Firm* — Withrow & Terranova, PLLC

(57) ABSTRACT

The present invention provides enhanced services from a packet network in association with incoming or outgoing POTS calls. These enhanced services may be provided without requiring control over any portion of the PSTN, which supports the POTS line over which the incoming or outgoing POTS calls are provided. A terminal adaptor is used to effectively connect a POTS line, a POTS-based telephone terminal, and the packet network. The terminal adaptor is configured to intercept POTS signaling associated with the incoming or outgoing calls, and send any resultant POTS signaling information to a service node or multimedia client associated with the telephone terminal to initiate the enhanced services via the packet network.

15 Claims, 13 Drawing Sheets

ENHANCED SERVICES FOR A POTS LINE

FIELD OF THE INVENTION

The present invention relates to telecommunications, and in particular to providing enhanced services in association with a plain old telephone system (POTS) line.

BACKGROUND OF THE INVENTION

Telephony communications have traditionally been provided by the public switched telephone network (PSTN), which remains dominant in providing telephony services using circuit-switched connections. The PSTN continues to provide the highest quality of service levels for telephony communications and extends to a vast majority of the population. With the ever-increasing availability and quality associated with voice-over-packet (VoP) technologies, there is a movement towards providing telephony communications in association with various types of media services via packet-switched networks.

An increasing number of households and businesses have both PSTN connections through telephony lines, such as POTS lines, as well as broadband access over packet-switched networks to provide access to the Internet, file transfer, streaming media, and the like. Although the PSTN provides a high quality of service, broadband access quality is continuing to increase and has reached a level at which voice communications are of an acceptable quality. Many of the media services made possible via packet-switched networks are very complementary to voice calls. With VoP technologies, the association of additional media services with voice sessions is relatively straightforward. Unfortunately, integration of media services with POTS calls has proven complicated, and subscribers have been reluctant to give up their POTS lines in favor of VoP technologies. Accordingly, there is a need for an efficient and cost effective technique to integrate media services provided via a broadband connection in association with voice calls provided over a POTS line.

SUMMARY OF THE INVENTION

The present invention provides enhanced services from a packet network in association with incoming or outgoing POTS calls. These enhanced services may be provided without requiring control over any portion of the PSTN, which supports the POTS line over which the incoming or outgoing POTS calls are provided. A terminal adaptor is used to effectively connect a POTS line, a POTS-based telephone terminal, and the packet network. The terminal adaptor is configured to intercept POTS signaling associated with the incoming or outgoing calls, and send any resultant POTS signaling information to a service node or multimedia client associated with the telephone terminal to initiate the enhanced services via the packet network. The service node or the multimedia client may provide instructions to the terminal adaptor for controlling how the incoming or outgoing calls are processed or routed.

Based on the signaling information, the service node and multimedia client may operate to provide various enhanced services, which are associated with the incoming or outgoing POTS calls. These services may include providing caller information, pictures, or other information to a user at the multimedia client in association with the incoming or outgoing calls. Further, additional media sessions may be established between the multimedia client and another multimedia client for file sharing, video conferencing, instant messaging, or other media sharing application. The terminal adaptor may also be configured to provide the necessary interworking between POTS and packet-based connections, as well as effect routing or forwarding of a call through any combination of its three interfaces.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a terminal adaptor that connects a POTS line, a high-speed network connection, and a telephone terminal configured to operate in conjunction with a POTS line. For the telephone terminal, the terminal adaptor can provide either a connection to the POTS line for POTS calls, or a connection to a packet network via the high-speed network connection for voice over packet (VoP) calls. For VoP calls, the terminal adaptor can provide the requisite conversion between analog and digital domains to emulate a POTS interface for the telephone terminal and provide a VoP interface for communications over the high-speed network connection.

The terminal adaptor also functions to intercept incoming or outgoing POTS signaling information and forward the intercepted POTS signaling information to an entity capable of providing enhanced services. The intercepted POTS signaling information may include but is not limited to caller identification information for incoming calls, such as the caller's name or number, as well as digits dialed from the telephone terminal for outgoing calls. The terminal adaptor may be integrated with the telephone terminal.

Enhanced services are services provided in association with a POTS call or the initiation thereof, and outside of the purview of the Public Switched Telephone Network (PSTN), which provides the POTS line. The enhanced services may involve controlling incoming or outgoing calls, as well as providing additional services in association with the POTS calls via a multimedia client, which may be implemented on a neighboring personal computer, personal digital assistant, or other computing device capable of providing multimedia services. The entity receiving the intercepted POTS signaling information from the terminal adaptor may be a network service node or the multimedia client. Notably, control of the PSTN is not required to provide the enhanced services made possible by the present invention. Prior to delving into the details of the present invention, an overview of a communication environment according to one embodiment is provided.

Figure 1:
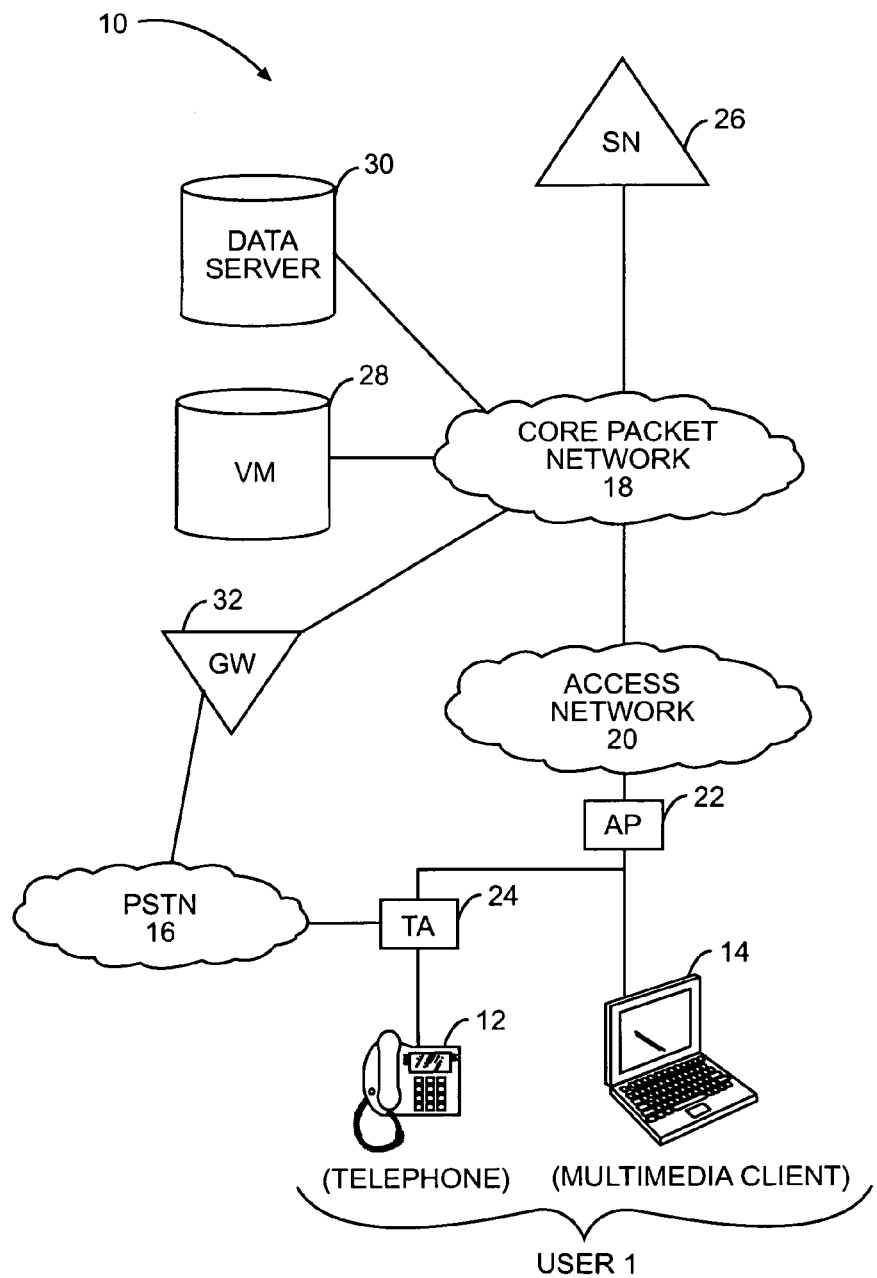
FIG. 1 is a block representation of a communication environment according to one embodiment of the present invention.

With reference to FIG. 1, a communication environment 10 is illustrated wherein a telephone terminal 12 is associated with a multimedia client 14 and is capable of facilitating telephony communications via a POTS line provided by the PSTN 16. The communication environment 10 also includes a core packet network 18, which is connected to an access network 20, wherein an associated access point (AP) 22 provides a high-speed network connection to the multimedia client 14 as well as to a terminal adaptor (TA) 24.

The terminal adaptor 24 has a POTS interface, a telephone terminal interface, and a network interface. The POTS interface connects to the POTS line leading to the PSTN 16. The telephone terminal interface emulates a POTS line and provides a POTS interface to the telephone terminal 12. The network interface provides a wired or wireless connection directly to the access network 20, or indirectly, such as via the access point 22. The terminal adaptor 24 may also be connected directly or indirectly to the multimedia client 14 in a manner wherein direct communications are possible.

The terminal adaptor 24 may be configured in numerous ways. In this embodiment, the terminal adaptor 24 provides the requisite functionality to selectively connect the POTS-based telephone terminal 12 to the PSTN 16 via a POTS line. The terminal adaptor 24 will also provide the necessary processing to support VoP communications over the core packet network 18 via the access network 20. Again, those skilled in the art will recognize the steps necessary to convert between analog-based POTS information to VoP communications.

The terminal adaptor 24 is configured to monitor and intercept POTS signaling for incoming or outgoing calls and send the intercepted POTS signaling information to the multimedia client 14 or to a service node 26 residing on the core packet network 18 to initiate enhanced services, if appropriate. Numerous examples of these enhanced services and how they are implemented are provided further below in association with the communication flows.

Continuing with FIG. 1, the communication environment 10 may include other entities, such as a voicemail server (VM) 28 for providing VoP-based voicemail services via the core packet network 18, as well as any number of data servers 30 that are accessible by the multimedia client 14 or the service node 26 to assist in provided the enhanced services of the present invention. Further, a gateway (GW) 32 may be provided between the core packet network 18 and the PSTN 16 to facilitate calls between terminals supported by the respective networks. For the following communication flows, assume that the telephone terminal 12 and the multimedia client 14 are associated with a user referenced as User 1.

The enhanced services may provide various types of control for call handling and call routing, as well as involving the multimedia client 14 in the call. For example, information may be provided to a user via the multimedia client 14 in association with POTS calls to or from the telephone terminal 12. The information may include information about the caller or the called party, and the information may include directory numbers or addresses associated with either party, pictures associated with either party, or any other information related to the parties to the call. Incoming and outgoing POTS calls may be logged by the multimedia client 14 or the service node 26. Incoming POTS calls may be screened wherein various rules may be applied, such as redirecting the incoming calls to voicemail systems 28 supported in the VoP domain, or directing the calls to another directory number. POTS calls involving the telephone terminal 12 may be initiated from the multimedia client 14 with the assistance of the terminal adaptor 24. Further, calls initiated by the telephone terminal 12 may be redirected through the VoP domain, wherein VoP calls initiated from the multimedia client 14 may be directed over the POTS line by the terminal adaptor 24. The call logs may be accessed and used by the multimedia client 14 to initiate VoP or POTS calls.

Figure 2:
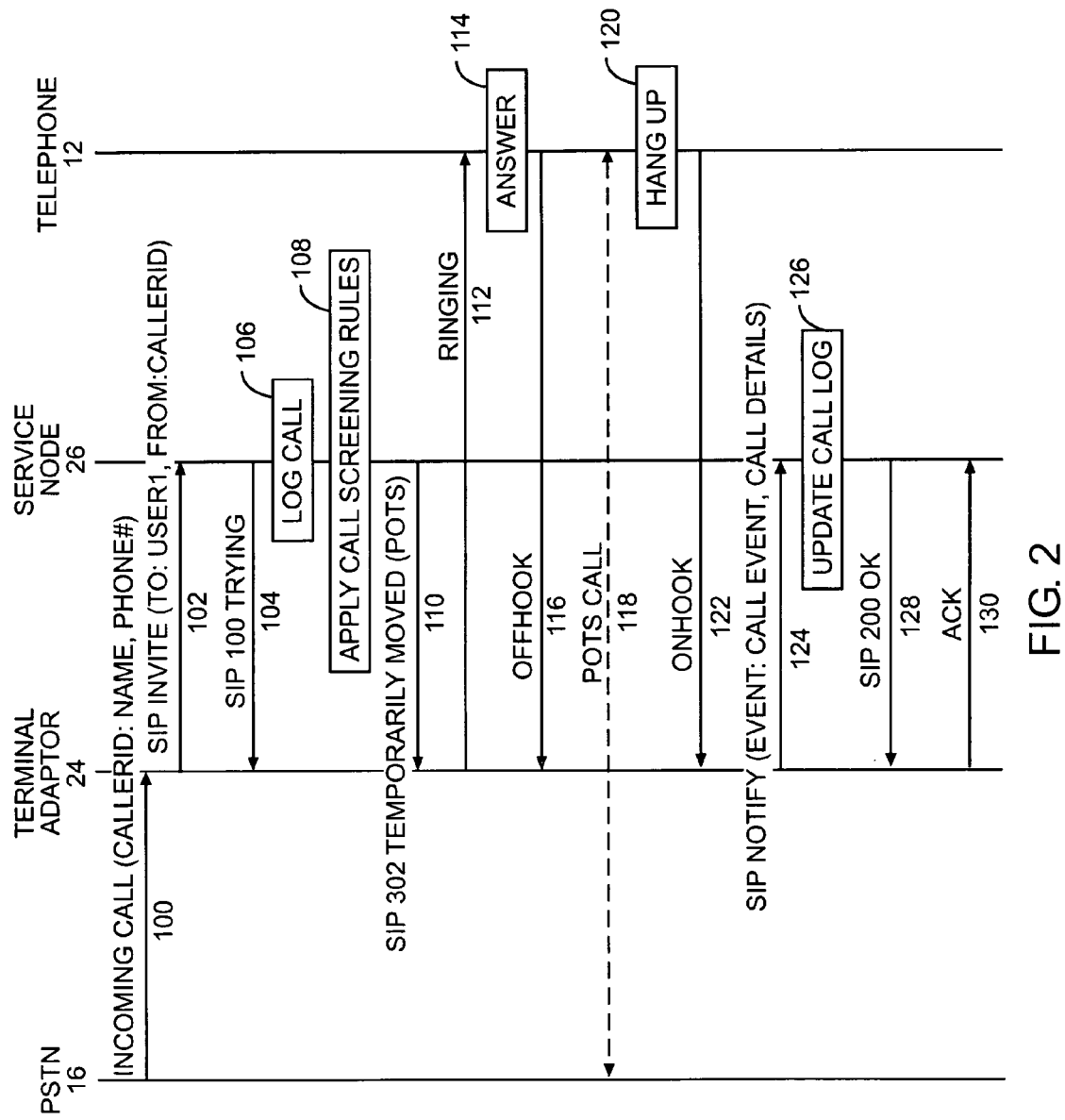
FIG. 2 is a communication flow wherein call screening rules are applied to an incoming call according to one embodiment of the present invention.

For the following communication flows, the Session Initiation Protocol (SIP) is used to facilitate information exchange and the control of communication sessions in the packet domain. With reference to FIG. 2, a communication flow is provided for applying call screening rules to an incoming POTS calls. In this example, the service node 26 will effectively log the call to update an incoming call log, as well as apply call screening rules that in this case result in allowing the incoming POTS call to be presented to the telephone terminal 12. The communication flow begins when an incoming call signal is received from the PSTN 16 by the terminal adaptor 24 (step 100). In this instance, the incoming call signal comprises traditional ring signals, which are two seconds in duration and spaced apart by four seconds.

Caller identification information (callerID) is provided between the first and second ring signals in the form of a name and telephone number associated with the call. The terminal adaptor 24 will detect the incoming call signal, intercept the callerID information, and send a SIP Invite message providing the callerID information and identifying the called party or telephone terminal 12 to the service node 26 (step 102). The service node 26 will respond with a SIP 100 Trying message (step 104) and begin processing the received information. In this example, the service node 26 will update a call log for User 1 by indicating that an incoming call is received from the caller using the callerID information (step 106).

The service node 26 may also maintain call screening rules for User 1. As such, the service node 26 will apply the call screening rules for User 1 to the incoming call using the callerID information (step 108). The call screening rules may be based on virtually any type of criteria, including information gathered from other sources, the current time, date, and callerID information. Assume that the call screening rules indicate that calls from the present caller should be immediately presented to the telephone terminal 12. The service node 26 will then send a SIP 302 Temporarily Moved message back to the terminal adaptor 24 indicating that the incoming POTS call should be presented to the telephone terminal 12 (step 110). As such, the terminal adaptor 24 will generate a Ringing signal for the telephone terminal 12 (step 112), which will cause the telephone terminal 12 to ring. When telephone terminal 12 is answered (step 114), the terminal adaptor 24 will detect that the telephone terminal 12 went Offhook (step 116). If the POTS line interface and the telephone terminal interface of the terminal adaptor 24 are not already connected, these interfaces will be connected such that the incoming POTS call is established with the telephone terminal 12 via the terminal adaptor 24 (step 118).

If User 1 hangs up the telephone terminal 12 to end the call (step 120), the telephone terminal 12 will go Onhook and the terminal adaptor 24 will detect that the telephone terminal 12 went Onhook (step 122). The terminal adaptor 24 may send a SIP Notify message providing any call details, such as the length of the call, to service node 26 (step 124). The service node 26 can update the call log with the additional information (step 126) and provide a SIP 200 OK message back to the terminal adaptor 24 (step 128) to provide an appropriate response to the original SIP Invite message (of step 102). In response, the terminal adaptor 24 will provide an acknowledgement (ACK) back to the service node 26 (step 130).

Figure 3:
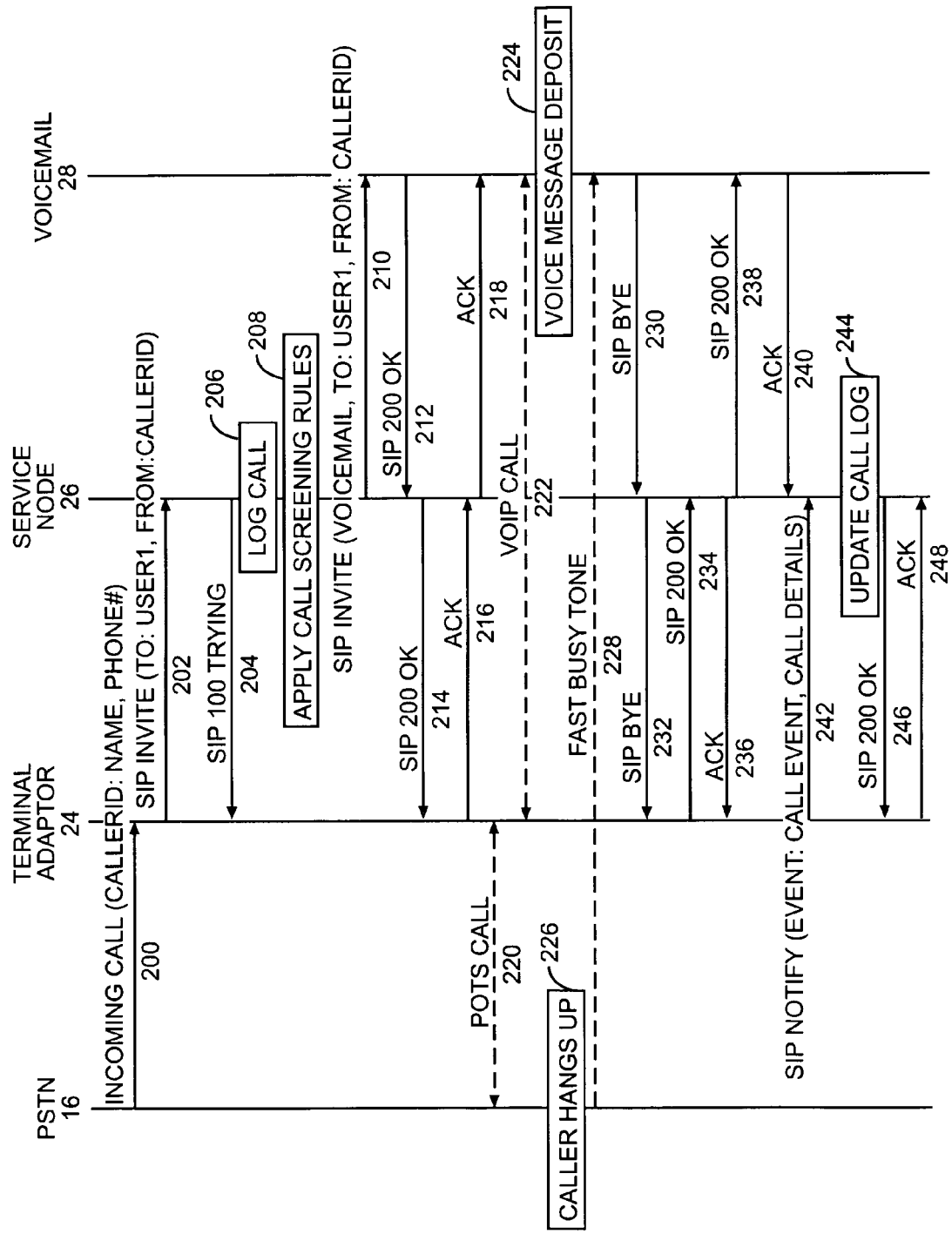
FIG. 3 is a communication flow wherein an incoming call is diverted to voicemail according to one embodiment of the present invention.

With reference to FIG. 3, a communication flow is provided to illustrate how the present invention can use the service node 26 to divert an incoming call to voicemail based on applicable call screening rules. An Incoming Call signal from the PSTN 16 is initially intercepted by the terminal adaptor 24 (step 200). Again, the incoming call signal will include callerID information for the caller, and the terminal adaptor 24 will send a SIP Invite message providing the callerID information and identifying the called party to the service node 26 (step 202). The service node 26 will respond with a SIP 100 Trying message (step 204) and proceed with logging the incoming call information (step 206) and applying the appropriate call screening rules for User 1 in light of any pertinent criteria, including perhaps the current time, date, and status of User 1 or associated telephony equipment, or the callerID information (step 208). Assume that the call screening rules dictate that the incoming call be directed to a VoP voicemail system 28. The service node 26 will send a SIP Invite message to the voicemail system 28 identifying the called party and perhaps providing the callerID information (step 210). The called party information will identify the voicemail account for User 1, and the callerID information may be stored for relaying back to the user when the voicemail is accessed. The voicemail system 28 will prepare itself for receiving a voicemail and will respond with a SIP 200 OK message (step 212). The service node 26 will send a SIP 200 OK message back to the terminal adaptor 24 (step 214), which will respond with an acknowledgement (step 216). The service node 26 will send an acknowledgement back to the voicemail system 28 (step 218).

During this message exchange, session information is provided to the terminal adaptor 24 and the voicemail system 28 via the service node 26 to establish a communication session from the terminal adaptor 24 to the voicemail system 28 via the core packet network 18. The terminal adaptor 24 will effectively go Offhook to allow the POTS call to be terminated at the terminal adaptor 24 (step 220), and will provide a VoP call to the voicemail system 28 (step 222). The terminal adaptor 24 will provide the requisite interworking between the POTS call and the VoP call to allow the voicemail system 28 to provide any requisite greetings or instructions to the caller, and allow the caller to provide a voice message to the voicemail system 28. The voice message is deposited in the voicemail system 28 (step 224) and the caller will hang up (step 226). The PSTN 16 may provide a fast busy tone when the call ends. The fast busy tone will be propagated through the terminal adaptor 24 to the voicemail system 28 (step 228), wherein the voicemail system 28 will end the voicemail service and send a SIP Bye message to the service node 26 (step 230), which will send a SIP Bye message to the terminal adaptor 24 (step 232). The terminal adaptor 24 will send a SIP 200 OK message to the service node 26 (step 234), which will respond with an acknowledgement message (step 236). The service node 26 will send a SIP 200 OK message to the voicemail system 28 (step 238), which will reply with an acknowledgement message (step 240). The terminal adaptor 24 can then send a SIP Notify message with the call details to the service node 26 (step 242), wherein the call log is updated (step 244). The service node 26 will send a SIP 200 OK message back to the terminal adaptor 24 (step 246), which will respond with an acknowledgement message (step 248).

Figure 4:
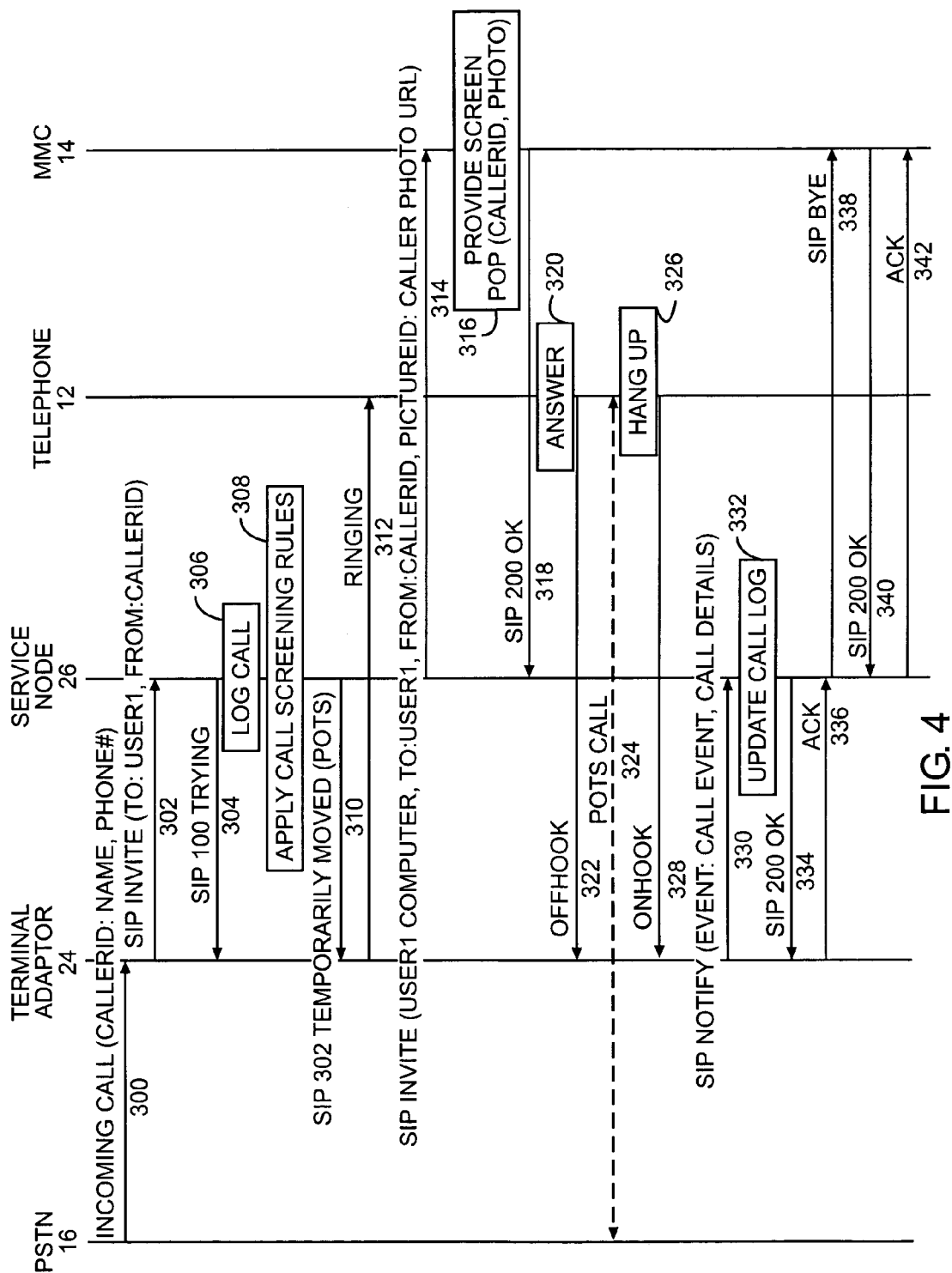
FIG. 4 is a communication flow wherein enhanced services are provided via a multimedia client associated with a telephone terminal according to one embodiment of the present invention.

With reference to FIG. 4, a communication flow is provided wherein enhanced services involving the multimedia client (MMC) 14 are provided in association with a POTS call. Initially, an incoming call signal is intercepted at the terminal adaptor 24 (step 300), wherein the associated callerID information and called party information are forwarded to the service node 26 in a SIP Invite message (step 302). The service node 26 will respond with a SIP 100 Trying message (step 304), log the call (step 306), and apply the appropriate call screening rules (step 308). In this instance, the call screening rules dictate that the call should be presented to the telephone terminal 12, and that the multimedia client 14 should provide a photograph of the caller to User 1. Accordingly, the service node 26 will send a SIP 302 Temporarily Moved message to the terminal adaptor 24 to trigger the presentation of the incoming call to the telephone terminal 12 (step 310). Accordingly, the terminal adaptor 24 will provide a Ringing signal to the telephone terminal 12 (step 312).

In the meantime, the service node 26 will send a SIP Invite message to the multimedia client 14 (step 314). The SIP Invite message identifies the multimedia client 14 as being associated with User 1, and provides the callerID information as well as other information, such as picture identification sufficient to allow the multimedia client 14 to gain access to a photograph of the caller, stored on the service node 26 or other data servers. Alternatively, the service node 26 may access the photograph and provide it to the multimedia client 14 in association with the SIP Invite message. The multimedia client 14 will then access the caller's photograph, such as by retrieving it using an appropriate uniform resource locator (URL), and provide the photograph as a screen pop or in another appropriate window to User 1 in association with any callerID information (step 316). The photograph of the caller may be accessed using the URL by sending an appropriate request to the data server 30, which will use the URL to access the photograph and provide the photograph in the form of a digital image to the multimedia client 14 (not shown). The multimedia client 14 will then send a SIP 200 OK message back to the service node 26 (step 318).

When the telephone terminal 12 is answered (step 320), the terminal adaptor 24 will detect that the telephone terminal 12 went Offhook (step 322) and the incoming call will be connected between the PSTN 16 and the telephone terminal 12 via the terminal adaptor 24 (step 324). By providing a picture of the caller along with any callerID information, an enhanced service is provided to User 1 without impacting or requiring control of the PSTN 16.

When the call is ended and telephone terminal 12 is hung up (step 326), the terminal adaptor 24 will detect that telephone terminal 12 is Onhook (step 328), and send a SIP Notify message to the service node 26 providing details for the call (step 330). The service node 26 will update the call log (step 332), and provide a SIP 200 OK message back to the terminal adaptor 24 (step 334). The terminal adaptor 24 will reply with an acknowledgement message (step 336). The service node 26 will then send a SIP Bye message to the multimedia client 14 (step 338), which will respond with a SIP 200 OK message (step 340). The service node 26 will then send an acknowledgment message back to the multimedia client 14 (step 342).

Figure 5:
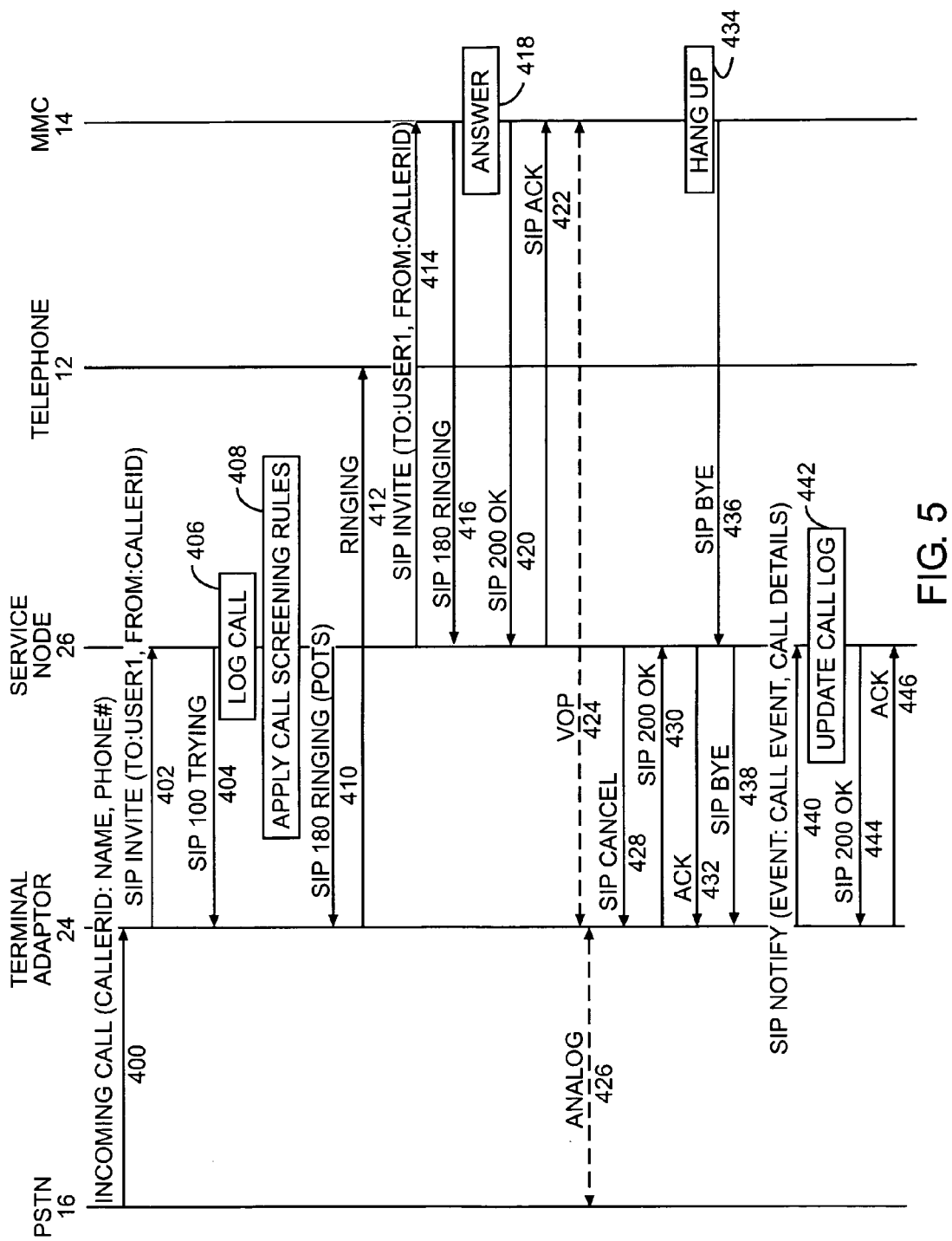
FIG. 5 is a communication flow wherein an incoming POTS call is answered by an associated multimedia client instead of a telephone according to one embodiment of the present invention.

With reference to FIG. 5, the terminal adaptor 24 allows an incoming POTS call to be answered by the multimedia client 14 using a VoP interface. Again, assume the incoming call signal is intercepted by the terminal adaptor 24 and the callerID information is sent to the service node 26 in a SIP Invite message (steps 400 and 402). The service node 26 will respond with a SIP 100 Trying message (step 404), log the incoming call (step 406), and apply the appropriate call screening rules (step 408). Assume that the call screening rules dictate that the terminal adaptor 24 should present the call to the multimedia client 14 as well as to the telephone terminal 12, and connect the call to the first of the two devices to be answered. Accordingly, the service node 26 will send a SIP 180 Ringing message back to the terminal adaptor 24 (step 410), which will trigger the terminal adaptor 24 to provide a Ringing signal to the telephone terminal 12 (step 412). The service node 26 will also send a SIP Invite message to multimedia client 14 (step 414). The SIP Invite message will identify that the call is intended for User 1, and provide the callerID information. The multimedia client 14 will respond by sending a SIP 180 Ringing message back to the service node 26 (step 416) and provide an indication that there is an incoming call from the caller to User 1.

Assume that User 1 answers the call at the multimedia client 14 and not at telephone terminal 12 (step 418). Accordingly, the multimedia client 14 will send a SIP 200 OK message to the service node 26 (step 420), which will respond with an acknowledgement message (step 422). At this point, a VoP session is established between the terminal adaptor 24 and the multimedia client 14 (step 424). The terminal adaptor 24 will then terminate the incoming POTS call (step 426) and provide an appropriate interface to the VoP session established with the multimedia client 14. The service node 26 will send a SIP Cancel message to the terminal adaptor 24 instructing the terminal adaptor 24 to stop presenting the Ringing signal to the telephone terminal 12 (step 428). The terminal adaptor will send a SIP 200 OK message to the service node 26 (step 430), which will respond with an appropriate acknowledgement (step 432).

When a Hangup event is detected, or the call is otherwise ended at the multimedia client 14, (step 434), the multimedia client 14 will send a SIP Bye message to the service node 26 (step 436), which will send a SIP Bye message to the terminal adaptor 24 (step 438). The terminal adaptor 24 will then send a SIP Notify message including callerID information, to the service node 26 (step 440), wherein the call log is updated (step 442). The service node 26 will then send a SIP 200 OK message to the terminal adaptor 24 (step 444), which will provide an acknowledgement to the service node 26 (step 446).

Figure 6:
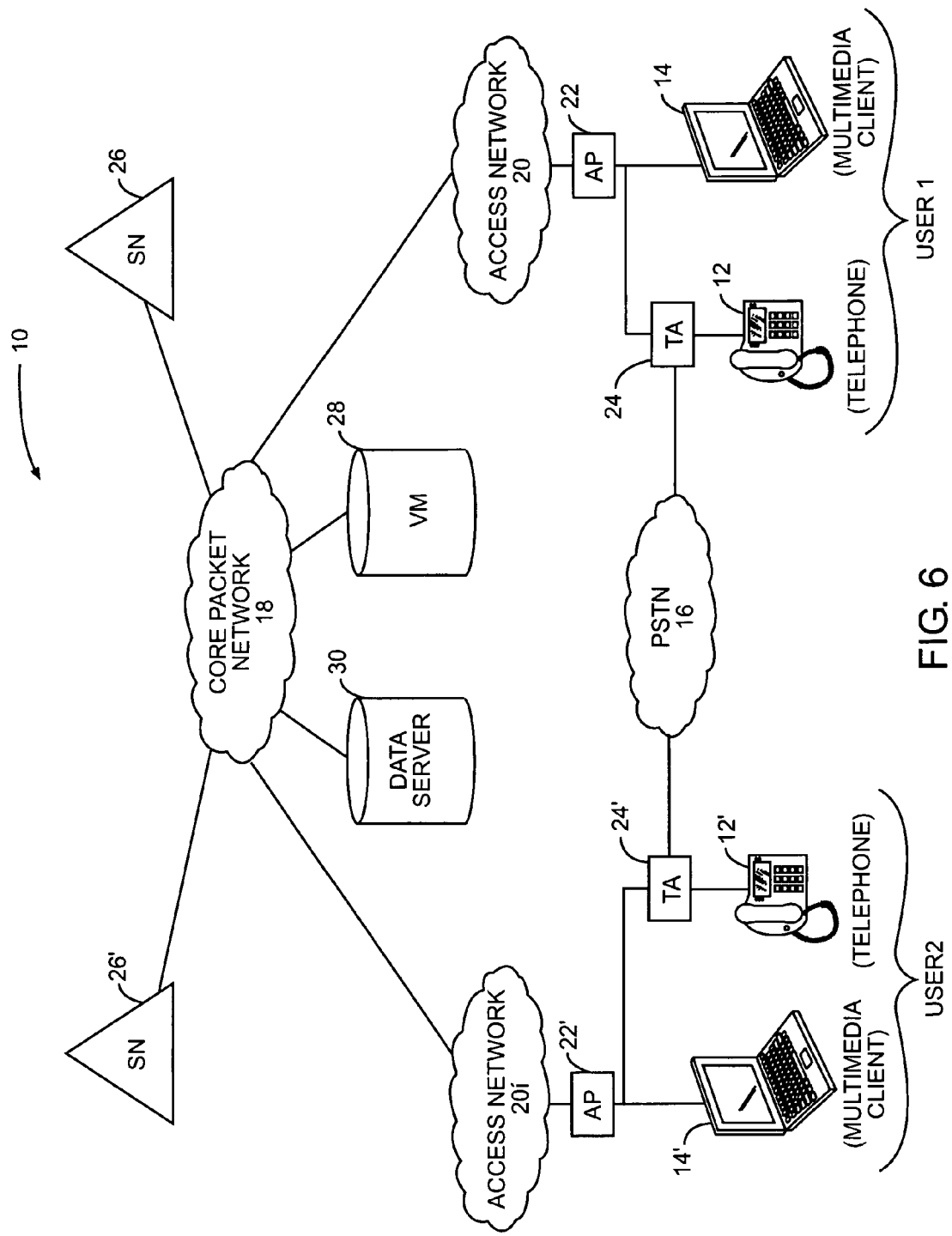
FIG. 6 is a block representation of a communication environment according to another embodiment of the present invention.

Turning now to FIG. 6, the communication environment 10 illustrates a second user, User 2, having an associated telephone terminal 12' and a multimedia client 14'. Telephone terminal 12' is associated with a terminal adaptor 24', which connects to the PSTN 16 through a POTS line, as well as connecting to the core packet network 18 via an access network 20', perhaps through an access point 22'. Although a single service node 26 may provide the functionality described below, a separate service node 26' is provided in association with User 2.

For the communication environment 10 illustrated in FIG. 6, the enhanced services provided by the present invention may include establishing separate communication sessions between multimedia clients 14 and 14' in association with a POTS call between telephone terminals 12 and 12', without requiring access to or control of the PSTN 16. Notably, the terminal adaptor 24' is not required for the example illustrated in FIGS. 7A and 7B. If present, the terminal adaptor 24' is configured to allow a direct connection between the telephone terminal 12' and the POTS line leading to the PSTN 16.

Figure 7A:
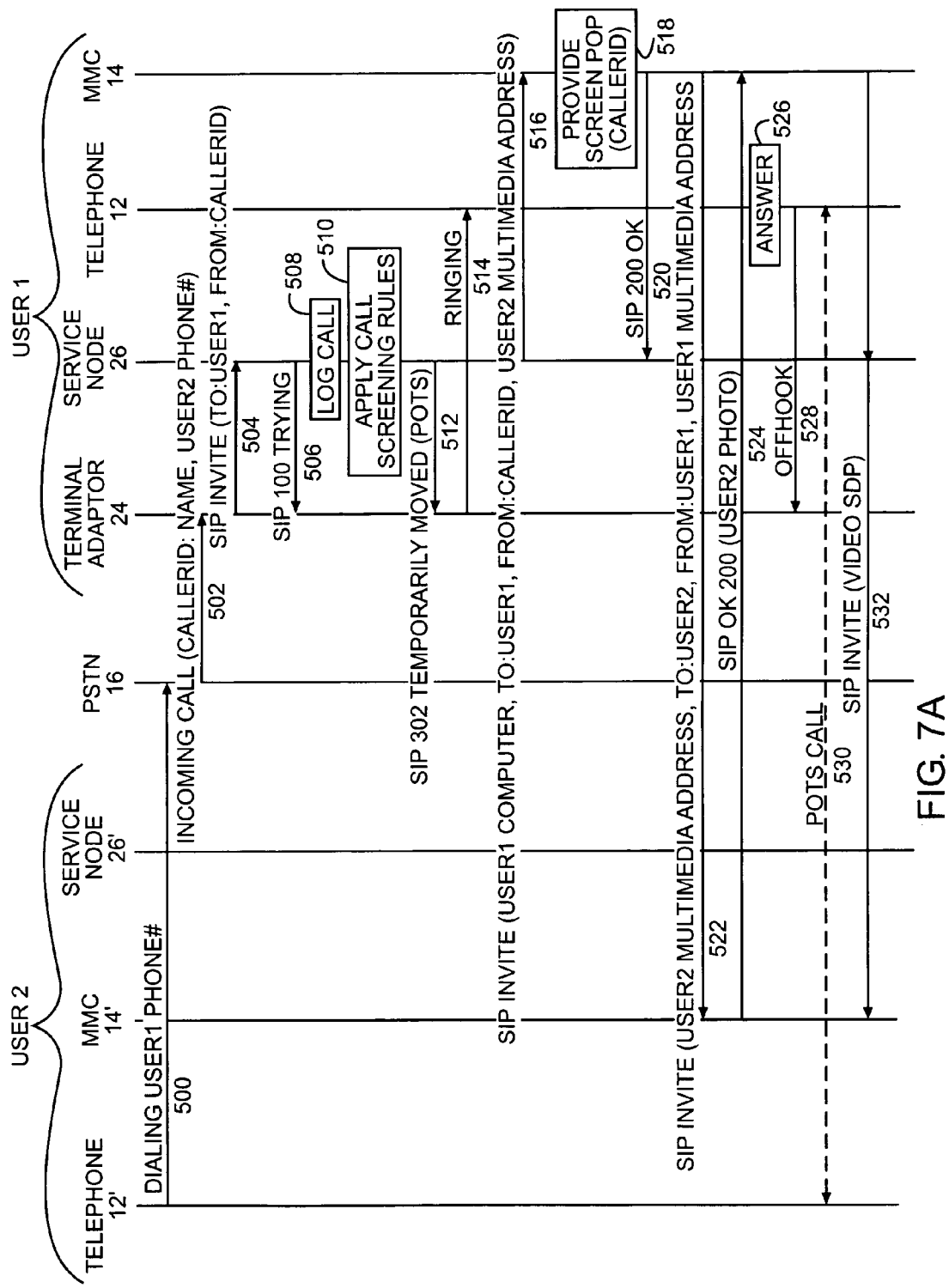
FIGS. 7A and 7B depict a communication flow diagram wherein a multimedia service is provided in association with a POTS call according to one embodiment of the present invention.
Figure 7B:
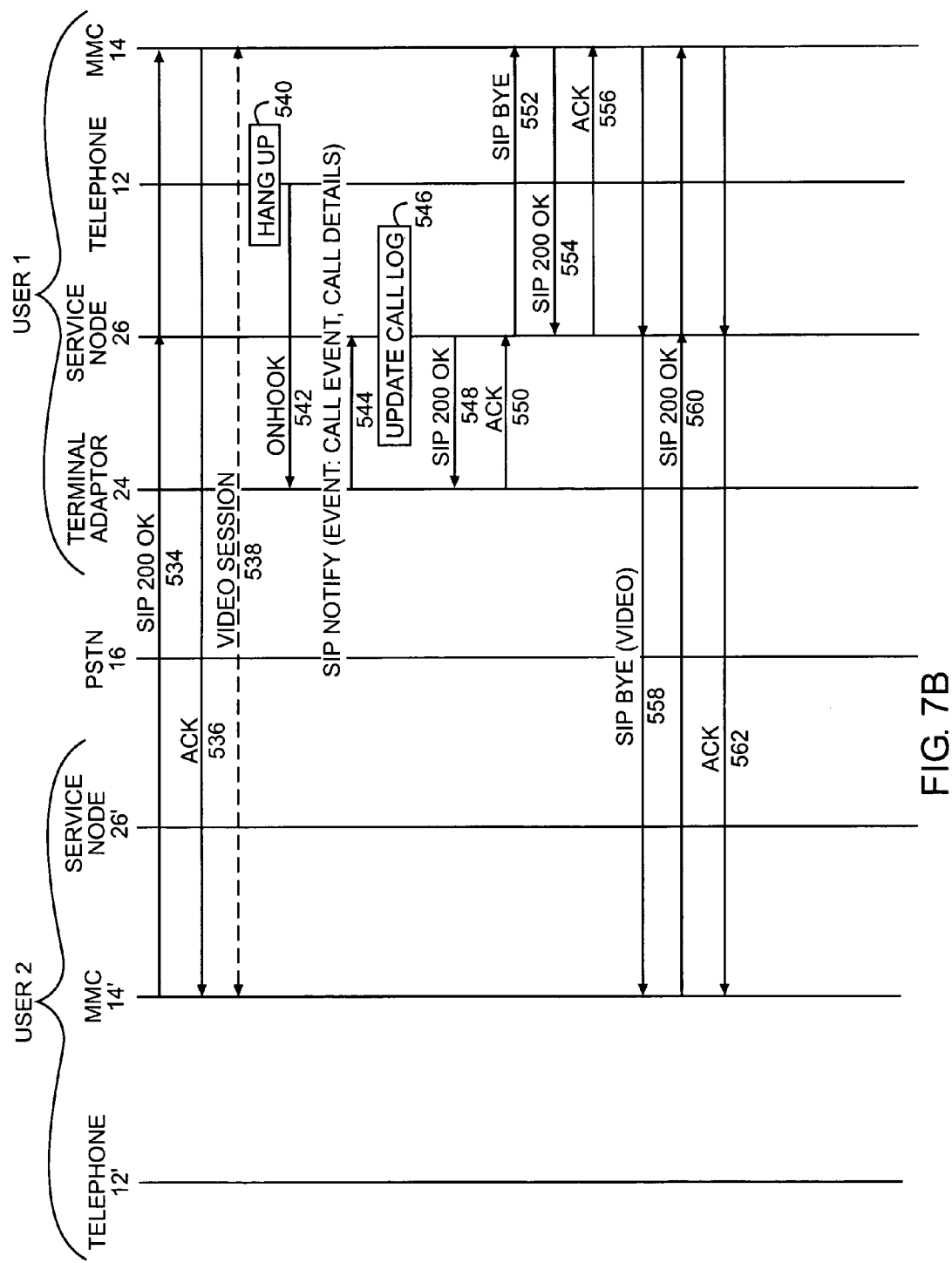

With reference to FIGS. 7A and 7B, initially assume User 2 initiates a POTS call from telephone terminal 12' to telephone terminal 12 of User 1. As such, telephone terminal 12' will provide dual-tone multi-frequency (DTMF) digits corresponding to the phone number of User 1 to an appropriate switch in the PSTN 16 in association with dialing telephone terminal 12 (step 500). The PSTN 16 will then provide an Incoming Call signal to the terminal adaptor 24, which resides on the POTS line associated with User 1 (step 502). The terminal adaptor 24 will intercept the incoming call signal and provide the callerID information to the service node 26 (step 504), which will respond with a SIP 100 Trying message (step 506), log the call (step 508), and apply any appropriate call screening rules (step 510). The service node 26 may recognize that the call screening rules dictate that the incoming call should be presented to telephone terminal 12, and that the multimedia address for multimedia client 14' of User 2 should be presented to multimedia client 14 of User 1. Accordingly, the service node 26 will send a SIP 302 Temporarily Modified message to the terminal adaptor 24 (step 512), which will provide a Ringing signal to telephone terminal 12 (step 514). The service node 26 will also send a SIP Invite message to multimedia client 14 of User 1 (step 516). The SIP Invite message will include the callerID information for User 2, as well as the multimedia address for multimedia client 14'. Multimedia client 14 may be configured to provide a screen pop or other window providing the callerID information to User 1 (step 518).

Multimedia client 14 will also send a SIP 200 OK message back to the service node 26 (step 520) in response to the SIP Invite message of step 514, as well as send a SIP Invite message to multimedia client 14' to provide it with the multimedia address of multimedia client 14 of User 1 (step 522). At this point, multimedia clients 14 and 14' of User 1 and User 2, respectively, have each other's addresses and any other information, such as codecs, availability requirements, communication ports, or other information beneficial in facilitating communications between multimedia clients 14 and 14'.

Multimedia client 14' will respond by sending a SIP 200 OK message to multimedia client 14 (step 524). The SIP 200 OK message may include a photo of User 2, which may be presented to User 1 by multimedia client 14 (not shown).

When telephone terminal 12 is answered (step 526), the terminal adaptor 24 will detect that telephone terminal 12 has gone Offhook (step 528), and take any steps necessary to allow the incoming POTS call to be connected to telephone terminal 12 of User 1. The incoming POTS call will be connected between telephone terminal 12' of User 2 and telephone terminal 12 of User 1 through the PSTN 16 and the terminal adaptor 24 (step 530). At this point, User 1 and User 2 can communicate with each other via their respective telephone terminals 12, 12'.

If desired, multimedia client 14 can initiate a video session with multimedia client 14' by sending a SIP Invite message including the requisite Session Data Protocol information (SDP) for the video session to multimedia client 14' (step 532). The SIP Invite message may be routed through the service node 26. Multimedia client 14' may respond with a SIP 200 OK message (step 534), which may be routed through the service node 26.

Multimedia client 14 will respond by sending an acknowledgement message back to multimedia client 14' (step 536). At this point, a video session is established between multimedia clients 14 and 14' (step 538), wherein a video conference can be provided between User 1 and User 2 using the POTS connection for voice and the SIP session for video.

When telephone terminal 12 is hung up (step 540), the terminal adaptor 24 will detect that telephone terminal 12 has gone Onhook (step 542) and send a SIP Notify message providing call details to the service node 26 (step 544). The service node 26 will update the call log (step 546) and provide a SIP 200 OK message back to the terminal adaptor 24 (step 548).

The terminal adaptor 24 may provide an acknowledgement message back to the service node 26 (step 550). The service node 26 will recognize that the video session must end, since the voice call has ended. As such, the service node 26 will send a SIP Bye message to multimedia client 14 (step 552), which will respond with a SIP 200 OK message (step 554). The service node 26 will then send an acknowledgement message to multimedia client 14 (step 556), which will send a SIP Bye message to multimedia client 14' directly or via the service node 26 (step 558). Multimedia client 14 will then send a SIP 200 OK message directly or through the service node 26 to multimedia client 14 (step 560), which will respond with an acknowledgement message (step 562).

Figure 8:
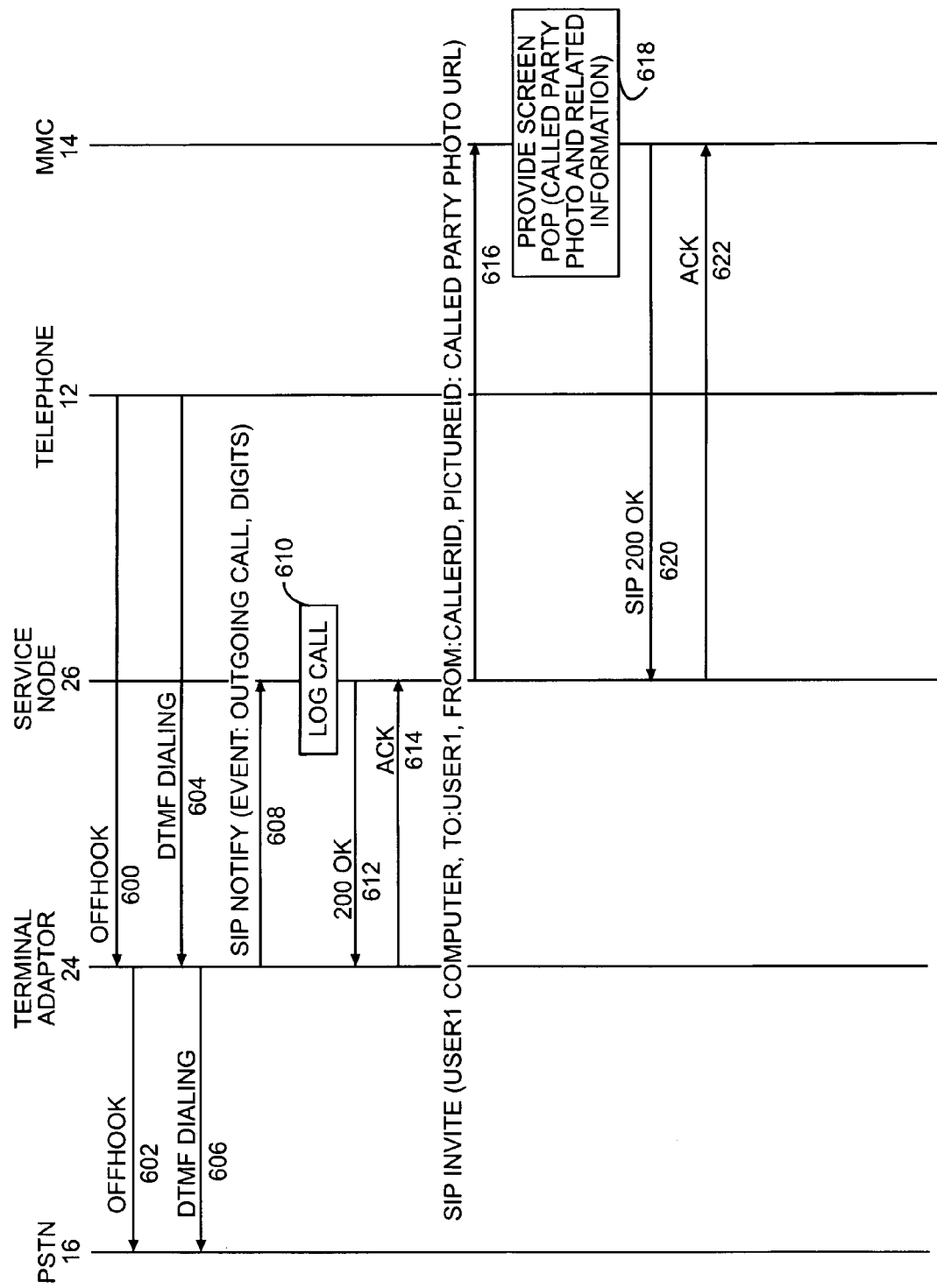
FIG. 8 is a communication flow diagram illustrating initiation of an outgoing call by a telephone according to one embodiment of the present invention.

The functionality of the terminal adaptor 24 for a basic outgoing call is provided in FIG. 8. Initially, the telephone terminal 12 will go off hook, and the Offhook status will be detected by the terminal adaptor 24 (step 600). The terminal adaptor 24 will then take the POTS line from the PSTN 16 Offhook (step 602). The telephone terminal 12 will provide DTMF dialing tones according to the number being dialed by User 1 to the terminal adaptor 24 (step 604). The terminal adaptor 24 will intercept the dialed digits, as well as provide the dialed digits over the POTS line through the PSTN 16 (step 606). During this process, the terminal adaptor 24 may separately generate the dialed digits over the POTS line or connect the POTS line from the PSTN 16 to the telephone terminal 12. In either event, the terminal adaptor 24 will connect the POTS line to the telephone terminal 12 once the call is connected. The terminal adaptor 24 will also provide a SIP Notify message to the service node 26 indicating that an outgoing call has been initiated and provide the dialed digits (step 608). The service node 26 will log the outgoing call in the outgoing call log (step 610) and provide a SIP 200 OK message to the terminal adaptor 24 (step 612). The terminal adaptor 24 can send an acknowledgement message back to the service node 26 (step 614).

The service node 26 may then send a SIP Invite message to the multimedia client 14 to indicate that an outgoing call is being made, and provide a URL associated with the called party (step 616). Again, the photo may be provided with the SIP Invite, or the URL for the called party's photo may be used to access the data server 30 to obtain the photo. Once the photo is obtained, the multimedia client 14 can provide a screen pop or other window to display the called party photo and any called party information to the user (step 618). The multimedia client 14 will then send a SIP 200 OK message to the service node 26 (step 620), which will respond with an acknowledgement (step 622).

Figure 9:
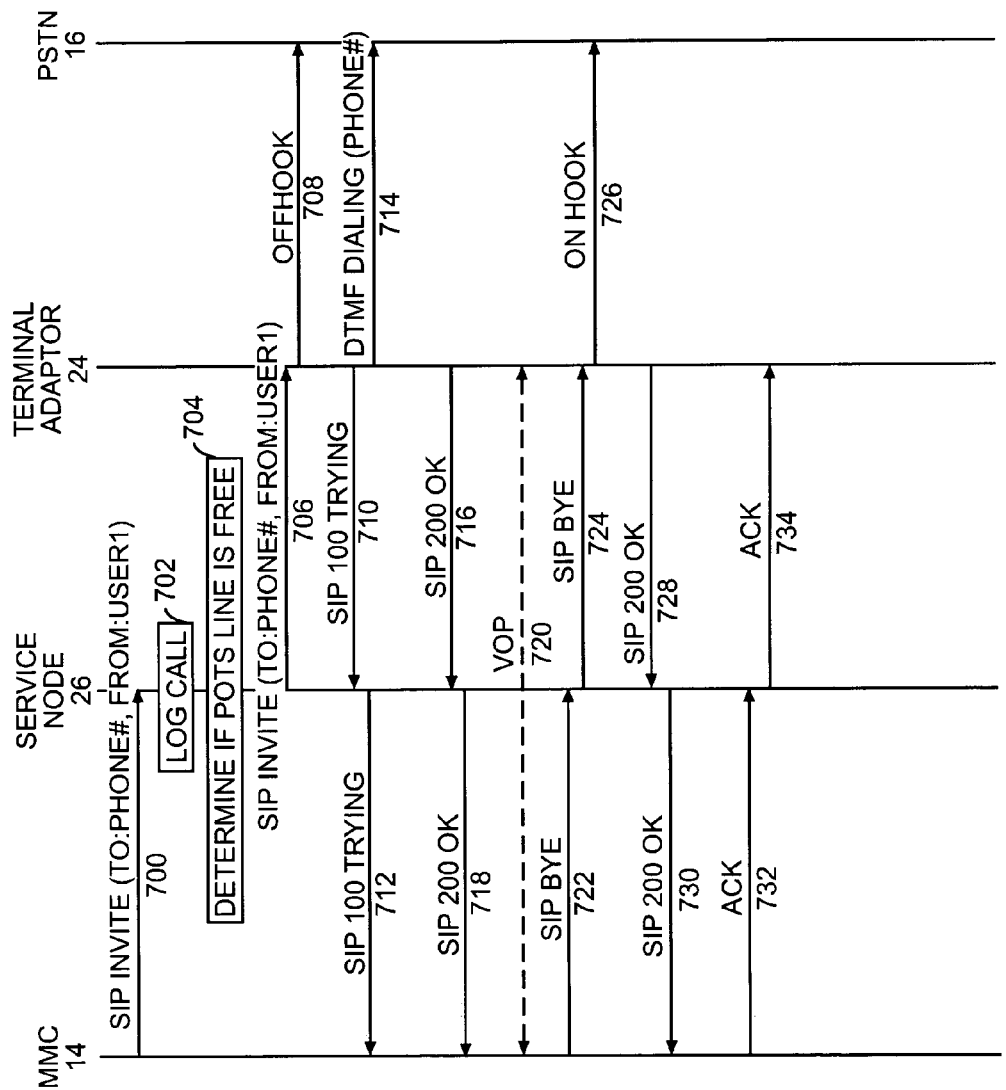
FIG. 9 is a communication flow diagram wherein an outgoing VoP call is rerouted to a POTS line according to one embodiment of the present invention.

In the communication flow diagram of FIG. 9, an outgoing VoP call initiated from the multimedia client 14 is directed over the POTS line. Assume the multimedia client 14 attempts to initiate a call to a select telephone number (or address). As such, multimedia client 14 will generate a SIP Invite message identifying the telephone number of the called party and send the SIP Invite message to the service node 26 (step 700). The service node 26 will log the outgoing call attempt (step 702), and based on the applicable call processing rules, determine if the POTS line is available for the call (step 704). If needed, the service node 26 may query the terminal adaptor 24 to determine the status of the POTS line. In this example, assume that the user has determined that calls to this particular number should be rerouted to the POTS line, if the POTS line is available. If the POTS line is not available, calls should be routed via the core packet network 18. Accordingly, the service node 26 will send a SIP Invite message to the terminal adaptor 24 indicating that multimedia client 14 is attempting to initiate a call to the identified telephone number, and that the call should be initiated via the POTS line of the PSTN 16 (step 706). The terminal adaptor 24 will take the POTS line Offhook (step 708) and once a dial tone is detected, will provide a SIP 100 Trying message to the service node 26 (step 710), which will send a SIP 100 Trying message to the multimedia client 14 to indicate that the call is being attempted (step 712).

After the POTS line is taken Offhook, the terminal adaptor 24 will generate DTMF dialing tones for the select telephone number over the POTS line to the PSTN 16 (step 714). Once the DTMF dialing is done, the terminal adaptor 24 will send a SIP 200 OK message to the service node 26 (step 716), which will send a SIP 200 OK message to the multimedia client 14 (step 718). A VoP session is established between the multimedia client 14 and the terminal adaptor 24 (step 720). At this point, the terminal adaptor 24 will provide the necessary interworking between the VoP session and the POTS line to facilitate the outgoing call.

When the multimedia client 14 is instructed to end the call, a SIP Bye message is sent to the service node 26 (step 722), which will send a SIP Bye message to the terminal adaptor 24 (step 724). The terminal adaptor 24 will then go Onhook to end the POTS connection (step 726), as well as send a SIP 200 OK message to the service node 26 (step 728). The service node 26 will send a SIP 200 OK message to the multimedia client 14 (step 730), which will respond with an acknowledgement message to the service node 26 (step 732). The service node 26 will then send an acknowledgement message back to the terminal adaptor 24 (step 734).

Figure 10:
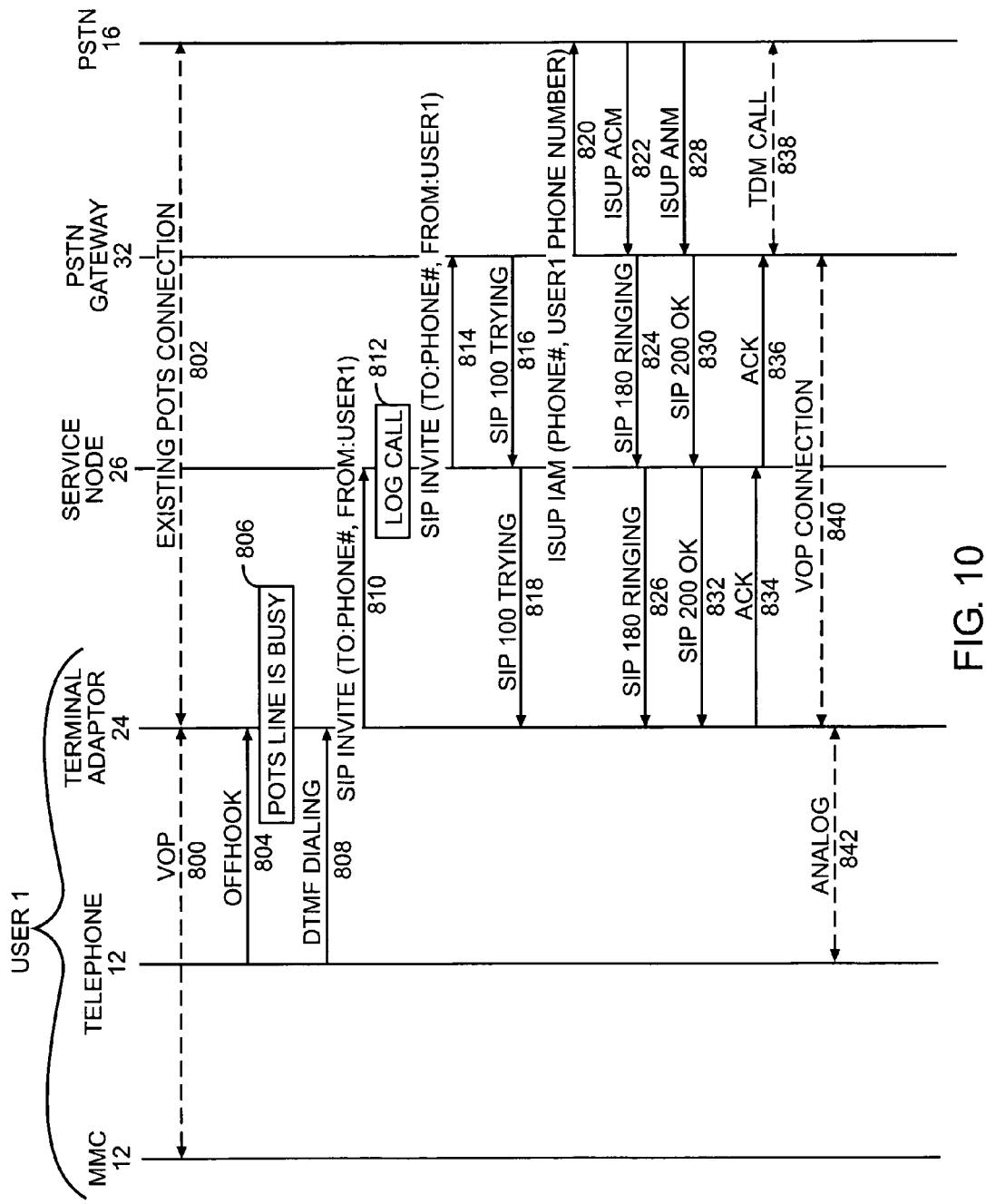
FIG. 10 is a communication flow diagram wherein an outgoing POTS call is diverted through the packet network according to one embodiment of the present invention.

Turning now to FIG. 10, a communication flow diagram is provided wherein an outgoing call from the telephone terminal 12 is provided as a VoP call via the core packet network 18 when the POTS line is busy. Assume that an existing call is being supported by the multimedia client 14 via the terminal adaptor 24. In particular, a VoP session is established with the multimedia client 14 (step 800), and an existing POTS connection is established between the terminal adaptor 24 and the PSTN 16 (step 802). When User 1 initiates a call from the telephone terminal 12, the terminal adaptor 24 will detect that the telephone terminal 12 has gone Offhook (step 804). The terminal adaptor 24 will recognize that the POTS line is busy (step 806), provide a dial tone to the telephone 12, and intercept the DTMF dialing digits provided by the telephone terminal 12 associated with initiating the call (step 808). The terminal adaptor 24 will then attempt to initiate a VoP session for the call through the core packet network 18. Accordingly, the terminal adaptor 24 will send a SIP Invite message to the service node 26 (step 810). The SIP Invite message will indicate that the call originated from User 1 and will indicate the telephone number (or address) for which it is intended. The service node 26 will receive the SIP Invite message, log the call (step 812), and attempt to establish the VoP session. In this instance, the telephone number is a directory number supported by the PSTN 16. As such, the service node 26 will recognize that the PSTN gateway 32 is the gateway to the PSTN 16, and will send a SIP Invite message to the PSTN gateway 32 (step 814). Again, the SIP Invite message will identify User 1 as the originator of the call, and the intended destination as a POTS line associated with the selected telephone number.

The PSTN gateway 32 will send a SIP 100 Trying message back to the service node 26 (step 816), which will send a SIP 100 Trying message to the terminal adaptor 24 (step 818). The PSTN gateway 32 will then send an Integrated Services User Part (ISUP) Initial Address Message (IAM) identifying the selected telephone number and the telephone number for User 1 through the PSTN 16 to initiate a connection between the PSTN gateway 32 and the called party's telephone terminal (step 820). The PSTN gateway 32 will receive an ISUP Address Complete Message (ACM) in response to the ISUP IAM (step 822), and will send a SIP 180 Ringing message to the service node 26 (step 824), which will forward the SIP 180 Ringing message to the terminal adaptor 24 (step 826). At this point, the called party's telephone terminal is ringing, and an appropriate signal could be provided to the telephone terminal 12 (not shown).

When the called party's telephone terminal is answered, the PSTN 16 will generate an ISUP Answer Message (ANM), which will be received by the PSTN gateway 32 (step 828). In response, the PSTN gateway 32 will send a SIP 200 OK message to the service node 26 (step 830), which will send a SIP 200 OK message to the terminal adaptor 24 to indicate the call has been answered (step 832). The terminal adaptor 24 will send an acknowledgement message to the service node 26 (step 834), which will send an acknowledgement message to the PSTN gateway 32 (step 836). At this point, a Time Division Multiplex (TDM) call connection is established between the PSTN gateway 32 and the called party's terminal through the PSTN 16 (step 838). Further, a VoP connection is established between the terminal adaptor 24 and the PSTN gateway 32 (step 840), which will provide the requisite interworking between the VoP connection and the TDM call connection. Further, the terminal adaptor 24 will provide an analog connection to the telephone terminal 12 (step 842) and provide the appropriate interworking between the analog connection and the VoP connection to support the call.

Figure 11:
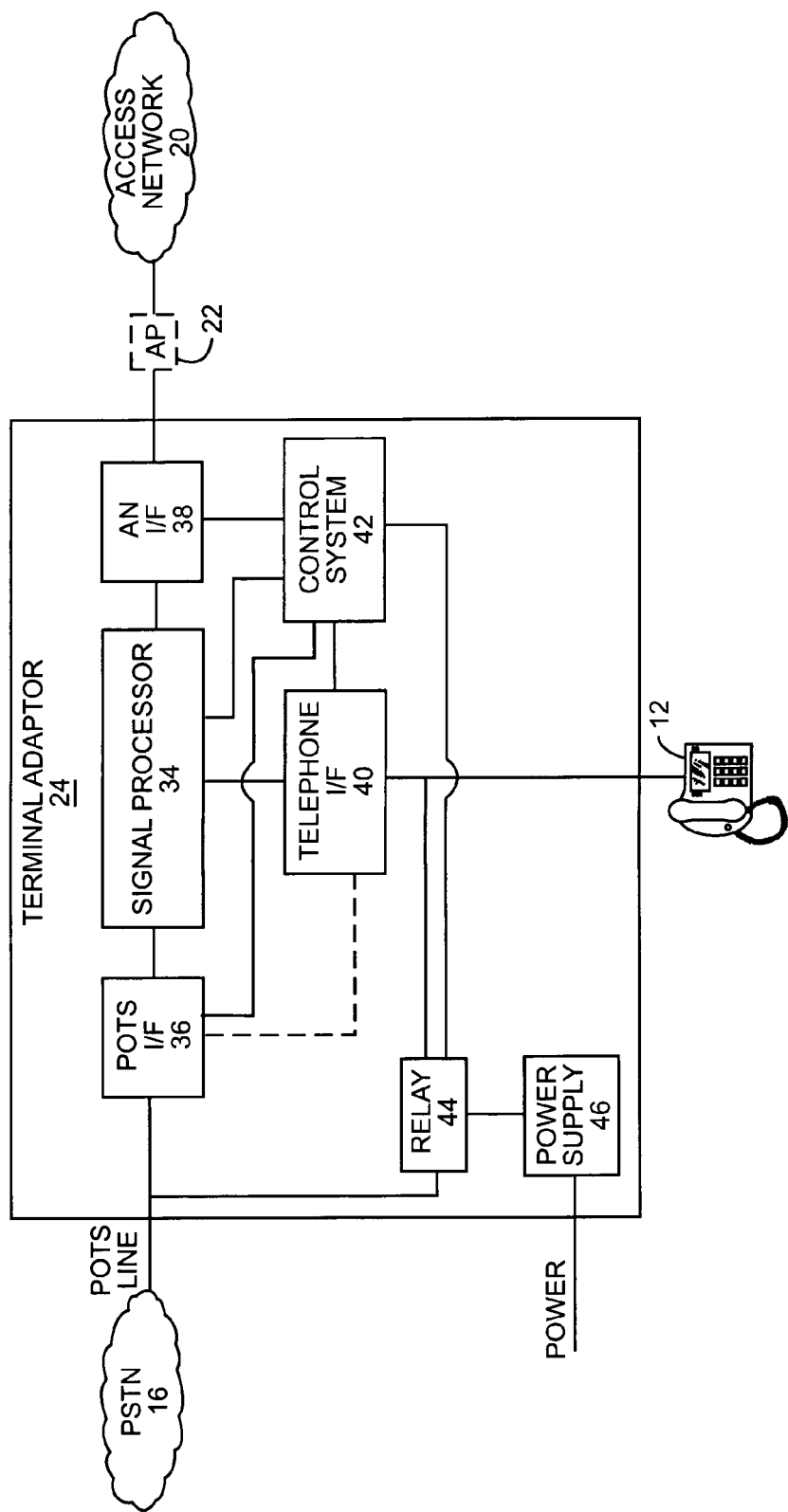
FIG. 11 is a block representation of a terminal adaptor according to one embodiment of the present invention.
Figure 12:
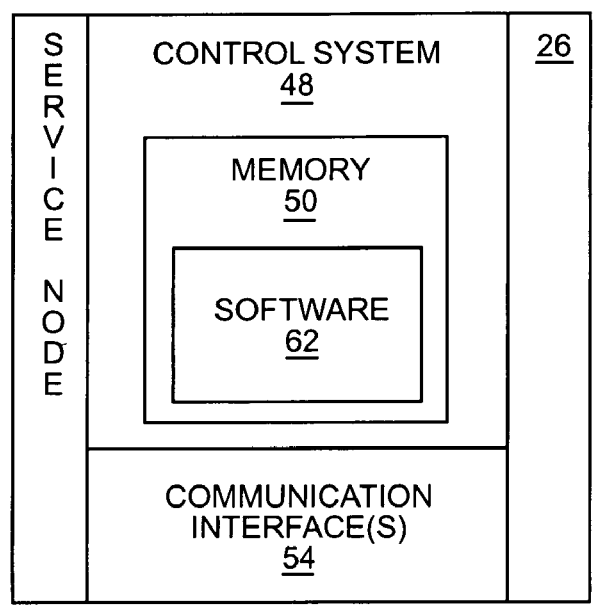
FIG. 12 is a block representation of a service node according to one embodiment of the present invention.

With reference to FIG. 11, a block representation of a terminal adaptor 24 is provided. In addition to a signal processor 34, the terminal adaptor 24 will include a POTS interface (I/F) 36, an access network (AN) interface 38, and a telephone interface 40. The POTS interface 36 provides an analog interface to connect to a POTS line provided by the PSTN 16. The access network interface 38 provides a packet connection through wired or wireless means directly to the access network 20 or indirectly to the access network 20 through an access point 22. The telephone interface 40 emulates the POTS line provided by the PSTN 16 to interface with one or more telephone terminals 12. In essence, the telephone interface 40 appears to be a POTS line to a connected telephone terminal 12.

The signal processor 34 may provide the requisite conversion between analog-to-digital and digital-to-analog, in light of the necessary packet protocols, to provide interworking between the POTS interface 36 and the access network interface 38, which will be appreciated by those skilled in the art. Further, the POTS interface 36 and the telephone interface 40 may be directly connected to one another or connected indirectly via the signal processor 34. In either case, the signal processor 34 will be connected to the POTS interface 36 and the telephone interface 40 to allow for monitoring of incoming and outgoing POTS signaling, such that the POTS signaling can be intercepted and provided to the multimedia client 14 or the service node 26 as described above. Control information from the multimedia client 14 and the service node 26 may be received via the access network interface 38. The signal processor 34 may process incoming calls from the POTS line and provide them to the telephone interface 40, as well as receive the analog information from the telephone terminal 12 via the telephone interface 40 and replicate the information at the POTS interface 36, and vice versa. As such, processing may be provided in the digital domain, even when a call is established with the telephone terminal 12 via the POTS line.

Alternatively, a direct analog connection (dashed line) can be provided between the POTS interface 36 and the telephone interface 40. A control system 42 may be associated with each of the interfaces, as well as with the signal processor 34, to provide the functionality described above. Further, a relay 44 may be provided and configured such that when there is a power failure and power is not received from the power supply 46, the relay 44 will default to a closed position, wherein the telephone terminal 12 is directly connected to the POTS line and the signal processor 34, and perhaps the POTS interface 36 and telephone interface 40, are bypassed.

Those skilled in the art will recognize improvements and modifications to the preferred embodiments of the present invention. All such improvements and modifications are considered within the scope of the concepts disclosed herein and the claims that follow.

What is claimed is:

1. An apparatus comprising:
 a plain old telephone system, POTS, line interface adapted to facilitate telephony communications via a POTS line provided by a public switched telephone network;
 a telephone terminal interface associated with the POTS line interface and adapted to facilitate telephony communications with a POTS-based telephone terminal such that incoming and outgoing POTS calls can be established with the POTS-based telephone terminal over the POTS line via the POTS line interface and the telephone terminal interface;
 a packet network interface adapted to facilitate packet communications; and
 a control system associated with the POTS line interface, the telephone terminal interface, and the packet network interface and adapted to:

intercept outgoing POTS signaling for an outgoing POTS call when the POTS line is busy;

determine outgoing POTS signaling information from the outgoing POTS signaling; and send the outgoing POTS signaling information to a service node via the packet network interface to initiate an enhanced service associated with the POTS call.

2. The apparatus of claim 1 wherein the control system is further adapted to:

receive an instruction from the service node via the packet network interface in response to sending the POTS signaling information; and control the POTS call based on the instruction.

3. The apparatus of claim 1 wherein the outgoing POTS call is an outgoing call to the public switched telephone network.

4. The apparatus of claim 1 wherein the control system is further adapted to:

establish a packet communication session via the packet network interface for the outgoing call;

establish a telephony connection with the POTS-based telephone terminal; and interwork the packet communication session and the telephony connection via a signal processing function to effect establishment of the outgoing call.

5. The apparatus of claim 4 wherein the outgoing call is intended to be established via the POTS line interface, and the control system is further adapted to detect that the POTS line is busy with the POTS call and redirect the outgoing call via the packet network interface.

6. The apparatus of claim 1 wherein the control system is further adapted to:

receive a call initiation message indicating an outgoing call from a multimedia client associated with the POTS-based telephone terminal is being requested;

establish a packet communication session via the packet network interface with the multimedia client;

initiate and establish a telephony connection via the POTS line interface to an intended destination for the outgoing call; and interwork the packet communication session and the telephony connection via a signal processing function to effect establishment of the outgoing call.

7. The apparatus of claim 1 wherein the outgoing POTS call is from the POTS-based telephone terminal.

8. The apparatus of claim 7 wherein the outgoing POTS signaling information comprises dual tone multi-frequency tones corresponding to dialed digits for the outgoing call.

9. The apparatus of claim 1 wherein the enhanced service is providing information related to the POTS call to a user via an associated multimedia client.

10. The apparatus of claim 1 wherein the enhanced service is generating a call log.

11. The apparatus of claim 1 wherein the outgoing POTS signaling is dual tone multi-frequency signals.

12. A method comprising:

receiving signaling information obtained from intercepting outgoing plain old telephone system, POTS, signaling during initiation of an outgoing POTS call when a POTS line is busy; and initiating an enhanced service associated with the POTS call at a service node without interacting with a public switched telephone network associated with the POTS call based on the signaling information.

13. The method of claim 12 wherein the signaling information is received from a terminal adaptor placed between the POTS line and a POTS-based telephone terminal.

14. The method of claim 13 further comprising generating instructions for handling the POTS call and sending the instructions to the terminal adaptor, wherein the terminal adaptor will control the POTS call based on the instructions to provide the enhanced service.

15. The method of claim 12 further comprising generating instructions for the enhanced service and sending the instructions to a multimedia client associated with a POTS-based telephone terminal, wherein the multimedia client will provide the enhanced service.

* * * * *